(12) United States Patent
Hsu (10) Patent No.: US 9,224,233 B2
(45) Date of Patent: Dec. 29, 2015

(54) BLENDING 3D MODEL TEXTURES BY IMAGE PROJECTION

(75) Inventor: Stephen Charles Hsu, San Carlos, CA (US)

(73) Assignee: Google Inc., Mountain View, CA (US)

( * ) Notice: Subject to any disclaimer, the term of this patent is extended or adjusted under 35 U.S.C. 154(b) by 716 days.

(21) Appl. No.: 13/479,952

(22) Filed: May 24, 2012

(65) Prior Publication Data

US 2015/0154805 A1    Jun. 4, 2015

(51) Int. Cl.
```
G09G 5/14      (2006.01)
G06T 17/20     (2006.01)
G06T 19/20     (2011.01)
G06T 15/04     (2011.01)
G06T 11/00     (2006.01)
```

(52) U.S. Cl.
CPC .............. *G06T 15/04* (2013.01); *G06T 11/001* (2013.01); *G06T 17/20* (2013.01); *G06T 19/20* (2013.01); *G09G 2340/10* (2013.01); *G09G 2340/12* (2013.01)

(58) Field of Classification Search
CPC ........... G06T 2200/32; G09G 2340/10; G09G 2340/12
See application file for complete search history.

(56) References Cited

U.S. PATENT DOCUMENTS

| | | | |
|---|---|---|---|
| 5,949,426 A * | 9/1999 | Rich | 345/582 |
| 6,271,847 B1 * | 8/2001 | Shum et al. | 345/418 |
| 6,359,617 B1 * | 3/2002 | Xiong | 715/848 |
| 6,762,769 B2 * | 7/2004 | Guo et al. | 345/582 |
| 6,912,293 B1 | 6/2005 | Korobkin | |
| 6,970,593 B2 | 11/2005 | Furukawa | |
| 7,193,633 B1 | 3/2007 | Reinhardt et al. | |
| 8,126,247 B2 | 2/2012 | Chiang et al. | |
| 8,160,391 B1 | 4/2012 | Zhu et al. | |
| 2003/0234786 A1 * | 12/2003 | Cole et al. | 345/426 |
| 2005/0128212 A1 | 6/2005 | Edecker et al. | |
| 2005/0212794 A1 | 9/2005 | Furukawa et al. | |
| 2006/0182367 A1 * | 8/2006 | Moghaddam | 382/276 |
| 2009/0141020 A1 | 6/2009 | Freund et al. | |
| 2009/0244062 A1 | 10/2009 | Steedly et al. | |
| 2010/0150472 A1 | 6/2010 | Chen | |
| 2011/0096083 A1 | 4/2011 | Schultz | |
| 2011/0187716 A1 | 8/2011 | Chen et al. | |

OTHER PUBLICATIONS

Tucker, et al., "NASA's global orthorectified Landsat data set," Photogrammetric Engineering & Remote Sensing, vol. 70, No. 3, (2004): 313-322.*

(Continued)

*Primary Examiner* — Kee M Tung
*Assistant Examiner* — Roberta D Prendergast
(74) *Attorney, Agent, or Firm* — Dority & Manning, P.A.

(57) ABSTRACT

An example method and system for blending textures of a composite image formed by a plurality of source images mapped onto a three dimensional model are presented. The composite image is projected to obtain an unblended projected image having textures. The textures are blended to obtain a blended projected image. Both the unblended and the blended projected images are backprojected onto the three dimensional model. A difference is determined between a pixel of the backprojected, blended image and a corresponding pixel of the backprojected, unblended image. The determined difference is then applied to a further corresponding pixel of the composite image to obtain a modified composite image representing a blending of the plurality of source images in the composite image.

24 Claims, 5 Drawing Sheets

(56) References Cited

OTHER PUBLICATIONS

Eisemann, Martin, Bert De Decker, Marcus Magnor, Philippe Bekaert, Edilson De Aguiar, Naveed Ahmed, Christian Theobalt, and Anita Sellent. "Floating textures." In Computer Graphics Forum, vol. 27, No. 2, pp. 409-418. Blackwell Publishing Ltd, 2008.*

Leprince, Sébastien, et al. "Automatic and precise orthorectification, coregistration, and subpixel correlation of satellite images, application to ground deformation measurements." Geoscience and Remote Sensing, IEEE Transactions on 45.6 (2007): 1529-1558.*

McAllister, David K., et al. "Real-time rendering of real world environments."Rendering Techniques' 99. Springer Vienna, 1999. 145-160.*

Anonymous, "UTM," Wikipedia definition, retrieved on Dec. 1, 2014 from: http://en.wikipedia.org/wiki/Universal_Transverse_Mercator_coordinate_system.*

Allène, C., et al., "Seamless Image-Based Texture Atlases using Multi-band Blending," *Proc. Intl. Conf. Pattern Recognition* (2008), 4 pages.

Baumberg, A., "Blending images for texturizing 3D models," *Proc. Conf. British Machine Vision Assoc*, pp. 404-413 (2002).

Burt, P.J., and Adelson, E.H., "A Multiresolution Spline With Application to Image Mosaics," *ACM Trans. Graphics* 2(4): pp. 217-236 (Oct. 1983).

Labatut et al, Efficient Multi-View Reconstruction of Large-Scale Scenes Using Interest Points, Delaunay Triangulation and Graph Cuts, Computer Vision, IEEE 11$^{th}$ International Conference, 2007. Retrieved on [Jan. 28, 2015], Retrieved from the internet: URL:http://www.normalesup.org/~labatut/papers/iccv2007-efficient-multiview.pdf.

Slabaugh, "Multi-View 3D Scene Reconstruction Using Arbitrarily Positioned Cameras", Qualifying Examination Report, Georgia Institute of Technology, 2000. Retrieved on [Jan. 28, 2015], Retrieved from the internet: <URL:http://citeseerx.ist.psu.edu/viewdoc/download?doi=10.1.1.33.5091&rep=rep1&type=pdf>.

Tung et al, Complete Multi-View Reconstruction of Dynamic Scenes from Probabilistic Fusion of Narrow and Wide Baseline Stereo, Computer Vision, IEEE 12$^{th}$ International Conference, 2009. Retrieved on [Jan. 28, 2015], Retrieved from Internet: <URL:http://www.normalesup.org/~labatut/papers/iccv2007-efficient-multiview.pdf.

Burt et al., "A Multiresolution Spline with Application to Image Mosaics", ACM Transactions on Graphics, vol. 2, No. 4, Oct. 1983, pp. 217-236.

Hsu, U.S. Appl. No. 13/660,257, filed Oct. 25, 2012, System and Method for Scene Dependent Multi-Band Blending.

Hsu, U.S. Appl. No. 14/331,260, filed Jul. 15, 2014, System and Method for Scene Dependent Multi-Band Blendin.

* cited by examiner

BLENDING 3D MODEL TEXTURES BY IMAGE PROJECTION

BACKGROUND

1. Field

This disclosure generally relates to texture blending of 3D models.

2. Background

A geographic information system (GIS) is a system that can be used for storing, retrieving, manipulating, and displaying a three-dimensional model. The three-dimensional model may include satellite images texture mapped to terrain, such as mountains, valleys, and canyons. The GIS uses a virtual camera to navigate through a three-dimensional environment. The virtual camera defines what portion of a three-dimensional model to display to a user in a display area.

A client device may display the three-dimensional model in a geographic information environment. The three-dimensional model may have any number of level-of-detail (LOD) representations that may be displayed in the geographic information environment. Accounting for an LOD of a three-dimensional model may increase or decrease the complexity of a three-dimensional model as a virtual camera moves closer to or farther from the model.

Texture is applied to a surface of the three-dimensional model to give the three-dimensional model a more realistic appearance. When the textures for the three-dimensional model are composited by switching among a plurality of source images, any illumination and exposure differences among the source images will lead to unnatural color discontinuities in the textured three-dimensional model at the decision boundaries.

BRIEF SUMMARY

This disclosure generally relates to systems and methods for blending the textures applied over a three-dimensional model from a plurality of source images.

An example method for blending textures of a composite image formed by a plurality of source images mapped onto a three dimensional model includes projecting the composite image to obtain a two dimensional, unblended projected image having textures. Next, the textures of the unblended projected image are blended to obtain a blended projected image. The method further includes backprojecting the unblended projected image and the blended projected image onto the three dimensional model. The method proceeds to determine a difference between a pixel of the backprojected, blended image and a corresponding pixel of the backprojected, unblended image. The method continues to apply the determined difference to a further corresponding pixel of the composite image to obtain a modified composite image representing a blending of the plurality of source images in the composite image.

In an embodiment, a system for blending textures of a composite image formed by a plurality of source images mapped onto a three dimensional model includes an image projector, a blending engine, a backprojecting engine, and a pixel processing unit. The image projector is configured to project the composite image to obtain an unblended projected image having textures. The blending engine is configured to blend the textures of the unblended projected image to obtain a blended projected image. The backprojecting engine is configured to backproject the unblended projected image and the blended projected image onto the three dimensional model. The pixel processing unit is configured to determine a difference between a pixel of the backprojected, blended image and a corresponding pixel of the backprojected, unblended image. The pixel processing unit is further configured to apply the difference to a further corresponding pixel of the composite image to obtain a modified composite image representing a blending of the plurality of source images in the composite image.

In another embodiment, an apparatus includes at least one non-transitory computer readable storage medium encoding instructions thereon that, in response to execution by a computing device, cause the computing device to perform example methods as described above.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

Overview

This description generally relates to blending the textures applied to a three dimensional model from a plurality of source images. The use of the word "mesh" may be used throughout the description herein to describe the underlying grid of the three-dimensional model over which the textures are applied, as would be understood to one having skill in the relevant art(s).

Mesh texturing almost always switches from one source image to another at many places on the mesh surface. If the image exposure or illumination conditions differ in juxtaposed images, the textured mesh may exhibit color discontinuities (including brightness changes) at those switching boundaries. In an embodiment, a blending stage aims to post-process the mesh textures to dissolve these discontinuities. The blending stage may be a stand-alone texture blending program for blending the textures of an input image. In another example, the blending stage may by one stage of a graphics pipeline such as, for example, a textured mesh pipeline. The textured mesh pipeline may include other stages configured to perform other operations related to producing the final three-dimensional, textured image. Examples of other stages may include a mesh creation stage, a mesh texturing stage, and a stage for improving the resolution of either the mesh or textures applied to the mesh.

Multiband blending is a simple, effective method for removing color discontinuities and is a known technique to one having skill in the relevant art(s). The technique does not rely on adjusting the source images and so can be performed after mesh texturing, without needing access to the source images. However, the standard form of multiband blending is defined and implemented for image functions on a two-dimensional Cartesian domain, rather than the two-dimensional manifold surface of a mesh. Embodiments described herein leverage the ability to blend textures of a two-dimensional image using multiband blending in order to blend textured three-dimensional meshes via an orthographic projection approach.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Image Blending Technique

In an embodiment, a two-dimensional ortho-image is created by projecting the textured mesh surface to the xy plane, multiband blending is performed on that two-dimensional image, then the blended image is back-projected onto the mesh. Appropriate pixel-by-pixel correction may be performed as well in order to maintain the resolution of the original three-dimensional image.

Figure 1:
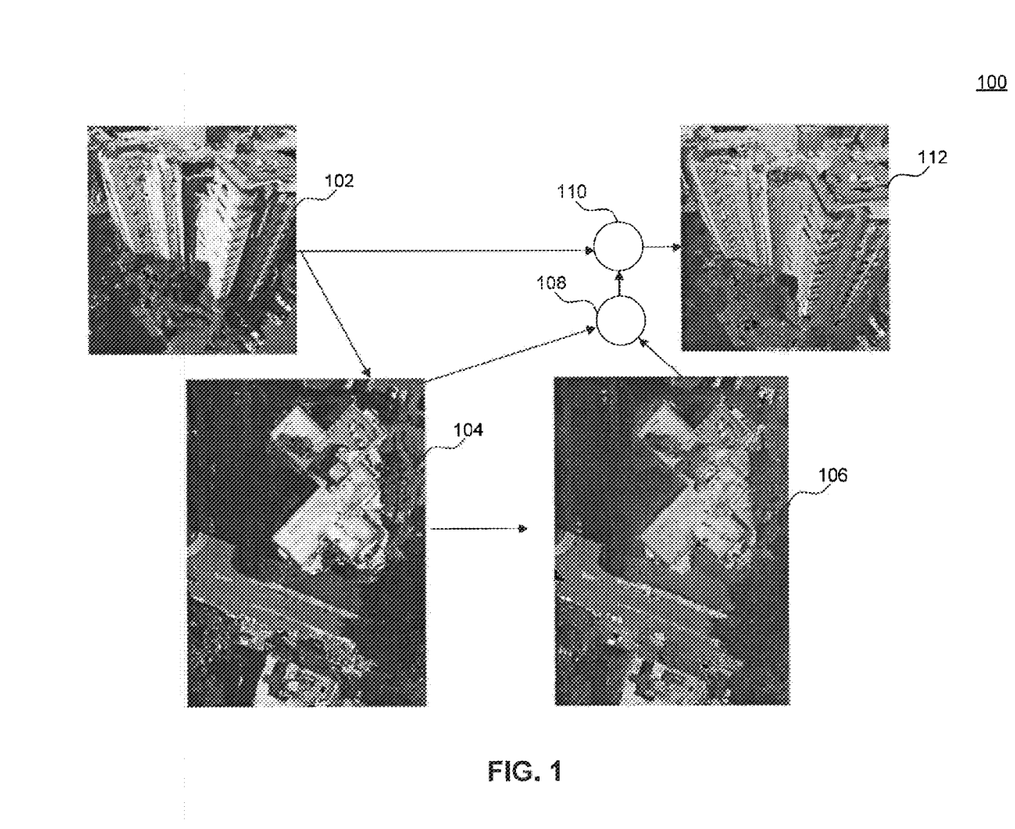
FIG. 1 illustrates a blending procedure of a three-dimensional image, according to an embodiment.

FIG. 1 illustrates a blending environment 100 where the textures of an example three-dimensional model are blended, according to an embodiment. It should be understood that the images displayed in blending environment 100 are for example purposes only and should not be construed as limiting the invention in any way. A three-dimensional viewpoint of a composite image 102 is provided and includes various shadow irregularities. In one example, the under lying three-dimensional shape of composite image 102 is derived from a digital surface model (DSM) such that only one surface point is provided for any given x and y coordinates. In an example, composite image 102 is an oblique image.

Composite image 102 may be formed by a plurality of source images taken from, for example, various angles and at various exposure settings. Additionally, the plurality of source images may be taken at different times and in different brightness conditions. The source images may be taken from various cameras mounted on one or more aircraft, or from an orbiting satellite.

Composite image 102 is first projected to form image 104, according to an embodiment. In one example, image 104 is an orthorectified version of composite image 202 and as such represents a two-dimensional "flattening" of the various surface points on the mesh of composite image 102. Image 104 is blended to form image 106. Image 104 may be blended using, for example, a multiband blending technique.

Each of image 104 and image 106 are backprojected onto the mesh, where a difference is determined between the corresponding pixels of image 104 and image 106, according to an embodiment. The pixel difference is represented by stage 108 in blending environment 100. For example, a pixel of image 104 may have its corresponding pixel in image 106 brightened by a factor of X during the multiband blending procedure. A brightness difference of X would be generated for that pixel. The difference of X could then be applied to the further corresponding pixel within the original composite image 102 at a difference applying stage 110. By applying the corresponding differences to each pixel of the composite image 102, a three dimensional representation of a blended composite image 112 is generated. In one example, the differences correspond to an additive change where the difference between pixels of image 104 and image 106 are added back to the corresponding pixel in composite image 102. In another example, the differences correspond to a multiplicative change where the pixel characteristics are divided between image 104 and 106 to calculate a quotient Y. The corresponding pixel in composite image 102 is then multiplied by the factor of Y. Other types of pixel differences may be contemplated as well without deviating from the scope or spirit of the blending technique.

One example of multiband blending as mentioned above for blending image 104 contains computation that requires combining of pixels depending on their corresponding source image. In such a case, each pixel should be identified with its corresponding source image in some fashion. One example is to tag each pixel with an identifier before any projection of the images takes place. However, it should be understood that pixel tagging or identification may not be necessary for all blending techniques.

In an embodiment, the pixels of the various images shown in blending environment 100 are tagged each with an identifier (e.g. an ID number) corresponding to their original source image. The ID information of each pixel is propagated through each image transformation. For example, a first pixel of composite image 102 may be associated with a first source image and is consequently tagged with a first ID while a second pixel of composite image 102 may be associated with a second source image and is consequently tagged with a second ID. The corresponding first and second pixels of the projected images would maintain the same tagged ID, according to an embodiment. In another example, clusters of pixels may be tagged with a unique ID for sharing any particular similarity such as, for example, the same source image, the same color, the same height, etc. Referring back to FIG. 1, the tagging of pixels may be performed by pixel processing unit 110. In one example, backprojecting unit 108 computes back-projections of only the corresponding pixels of images 104 and 106 that share the same ID. In this way, the backprojections may be created based on the original source images.

Texture Blending System

Figure 2:
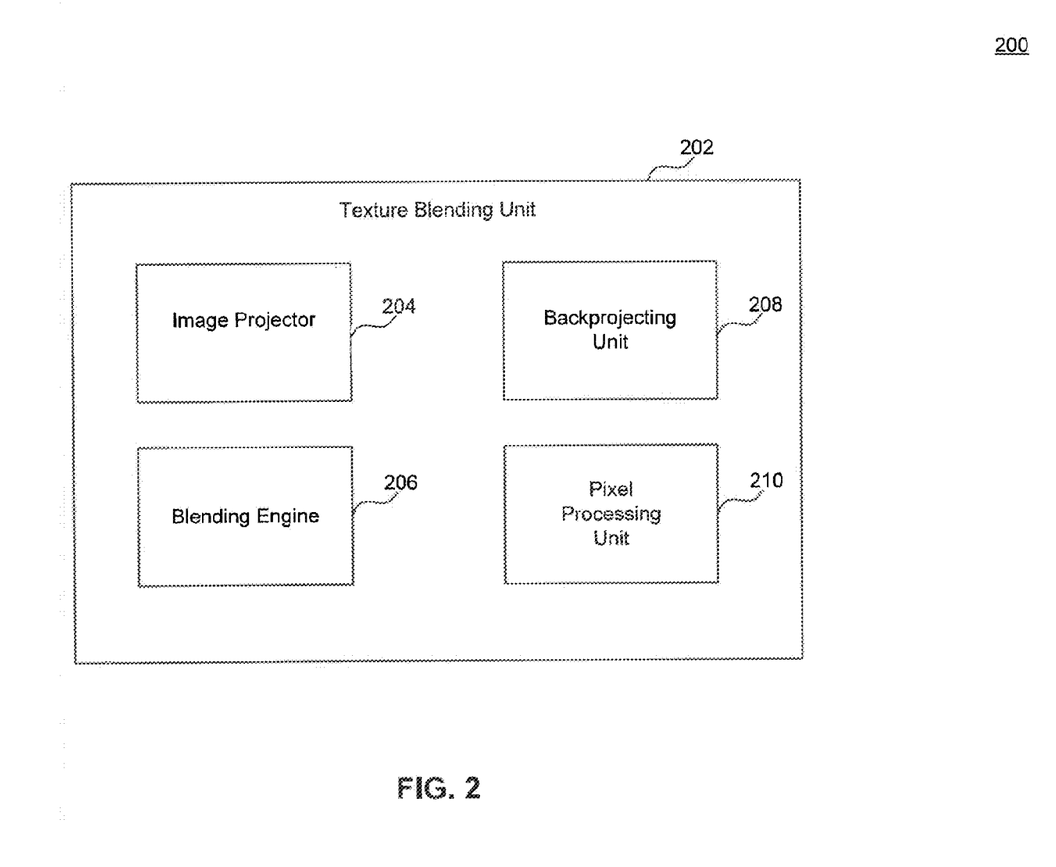
FIG. 2 is a diagram illustrating the components of a texture blending unit, according to an embodiment.

FIG. 2 illustrates an example of a texture blending system 200, according to an embodiment. Texture blending system 200 may be one stage of a graphics pipeline such as, for example, a textured mesh pipeline. Texture blending system 200 may be implemented in software, firmware, or hardware, or any combination thereof. Accordingly, in one example, texture blending system 200 may be realized as a program or coded instructions stored in memory and executed by one or more processing units. Texture blending system 200 may include suitable components to perform, for example, the image blending technique described in FIG. 1.

Texture blending system 200 may include one or more texture blending units 202 each including components configured to blend the textures of a three-dimensional image. For example, texture blending unit 202 may include an image projector 204, a blending engine 206, a backprojecting unit 208, and a pixel processing unit 210. Each component may be realized as a separate group of coded instructions within a program, and may be executed serially or in parallel by one or more processors. Alternatively, each component may be associated with its own hardware configured to execute the various functions of each component.

Image projector 204 maps the texture content of the three-dimensional image to a two-dimensional image, according to an embodiment. For example, image projector 204 performs orthorectification of a composite image to obtain an unblended projected composite image. The composite image is formed by a combination of a plurality of source images. In one example, the source images illustrate the content of the three-dimensional model at various angles, causing image distortions when the source images are combined. In another example, the source images illustrate the content of the three-dimensional model at various brightness levels or exposure settings, causing color discontinuities when the source images are combined. The unblended projected composite image still includes the effects of the various image distortions and/or color discontinuities. Other types of image projections such as perspective or distortion projections may also be used to form the unblended projected composite image.

Blending engine 206 blends the textures of the unblended projected image to obtain a blended projected image, according to an embodiment. In an example, blending stage 206 blends the two-dimensional projected image using a multi-band blending technique. Blending stage 206 may perform blending over the entire image or over tiled portions of the image. For example, the image may be broken down into a plurality of tiles that are each blended separately using multi-band blending, then the tiles are combined back using any suitable blending technique such as, for example, an alpha-blending technique.

Backprojecting unit 208 backprojects the unblended projected image and the blended projected image onto the mesh, according to an embodiment. Thus, backprojecting unit 208 may be configured to backproject any two-dimensional image onto a mesh to create a three-dimensional model.

Simply backprojecting the blended projected image onto the mesh to generate a finished, blended three-dimensional model would cause various image irregularities to the finished model. For example, the texture resolution would be lower and would not be adequately reproduced for steeply sloped surfaces or vertical surfaces.

For at least these reasons, in an embodiment, the variations between pixels of the unblended and blended projected images are compared and the difference is applied back to the corresponding pixels of the original three-dimensional composite image. Pixel processing unit 210 is configured to determine a difference between a pixel of the backprojected, blended image and a corresponding pixel of the backprojected, unblended image. The difference may represent, for example, a change in the hue of the pixel, or a change in the brightness of the pixel. In another example, the difference is determined between a group of corresponding pixels of the blended and unblended projected images.

In an embodiment, pixel processing unit 210 is further configured to apply the determined difference to a further corresponding pixel of the composite image to obtain a modified composite image representing a blending of the plurality of source images in the composite image. This blending technique captures the low frequency changes in the projected image induced by the blending performed by blending engine 206, while preserving the high frequency details of the mesh textures in the original composite image.

In an embodiment, pixel processing unit 210 is further configured to tag pixels with an identifier (e.g., an ID) associated with a particular source image. In one example, backprojecting unit 208 computes backprojections of only the corresponding pixels of images 104 and 106 that share the same ID. In this way, the backprojections may be created based on the original source images.

Any one of image projector 204, blending engine 206, backprojecting unit 208 and pixel processing unit 210 includes suitable hardware and/or software to perform the various functions described above.

Tiled Blending Technique

Figure 3:
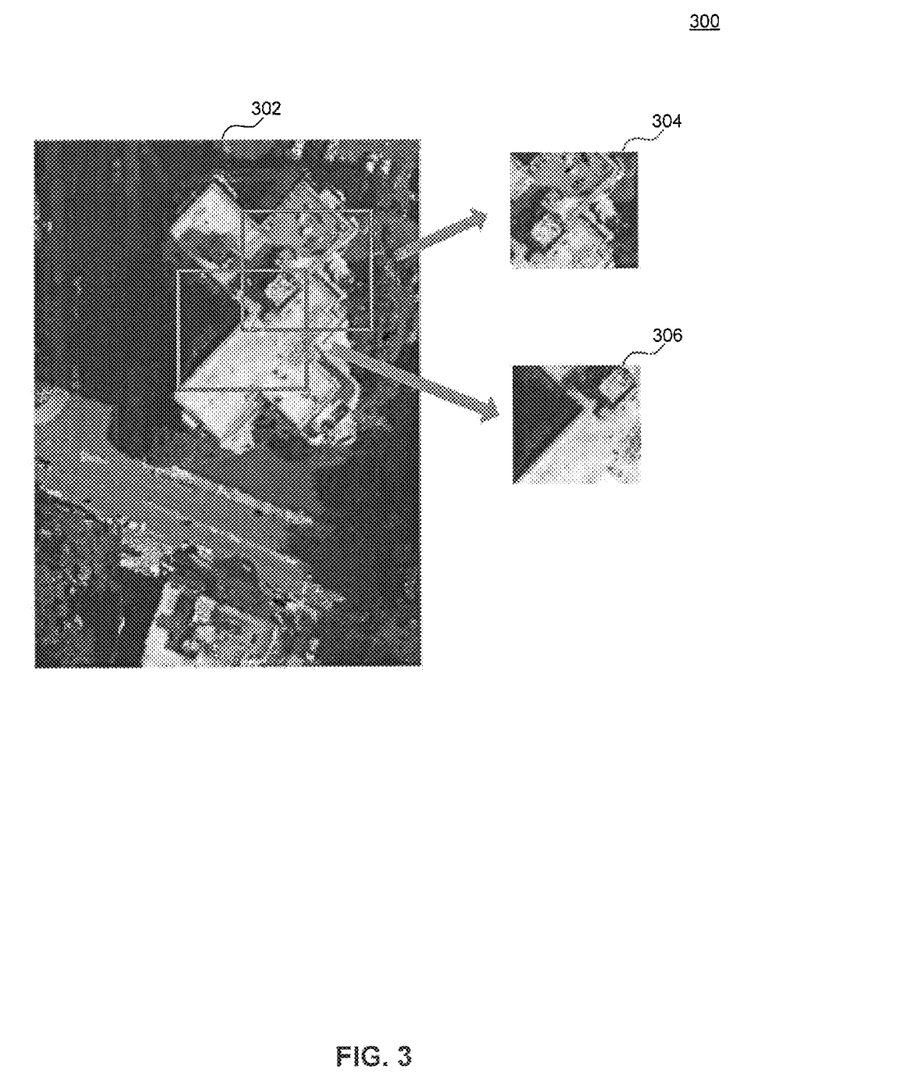
FIG. 3 illustrates a blending procedure of tiled portions of an image, according to an embodiment.

FIG. 3 illustrates a tiled blending technique 300 of an example orthorectified image 302, according to an embodiment. Rather than blending the entire orthorectified image 302 as a whole, orthorectified image 302 may be broken down into smaller tiles. These tiles may then be blended separately from each other using, for example, a multiband blending technique. Blending the tiles instead of the entire orthorectified image 302 reduces the amount of memory necessary to perform the blending. In another example, blending of the tiles can be performed using parallel processing to further speed up the blending time. In an embodiment, the tiles are each overlapped by up to 50% in both x and y dimensions. In one example, the tiles are each overlapped by exactly 50% in both x and y dimensions. It should be appreciated that the tiles may overlap by any amount in either or both the x and y dimensions.

In the example illustrated in FIG. 3, tiled image 304 and tiled image 306 have been extracted from orthorectified image 302. The use of only two tiled images is for illustrative purposes only and it should be understood that more tiles, including tiles that comprise the entire orthorectified image 302, may be considered. In an embodiment, tiled image 304 and tiled image 306 are each multiband blended separately from one another.

In order to reform a full blended image, the various tiles may be blended together using, for example, an alpha-blending technique. In one example, the blending of the tiles together involves blending each overlapping portion with equal weight across, the entire overlapped region. In another example, the blending involves blending overlapping portions as a weighted function that decays linearly moving outward from the center of each tile.

It should be understood that the tiling concept may be utilized for actions other than image blending. For example, the various functions performed by image projector 204 and backprojecting unit 208 may be performed on tiled portions of an image rather than the entire image. Thus, parallel processing may be used on tiled portions of the various images and image manipulations throughout the procedure illustrated in FIG. 1.

Computer Embodiment

Figure 4:
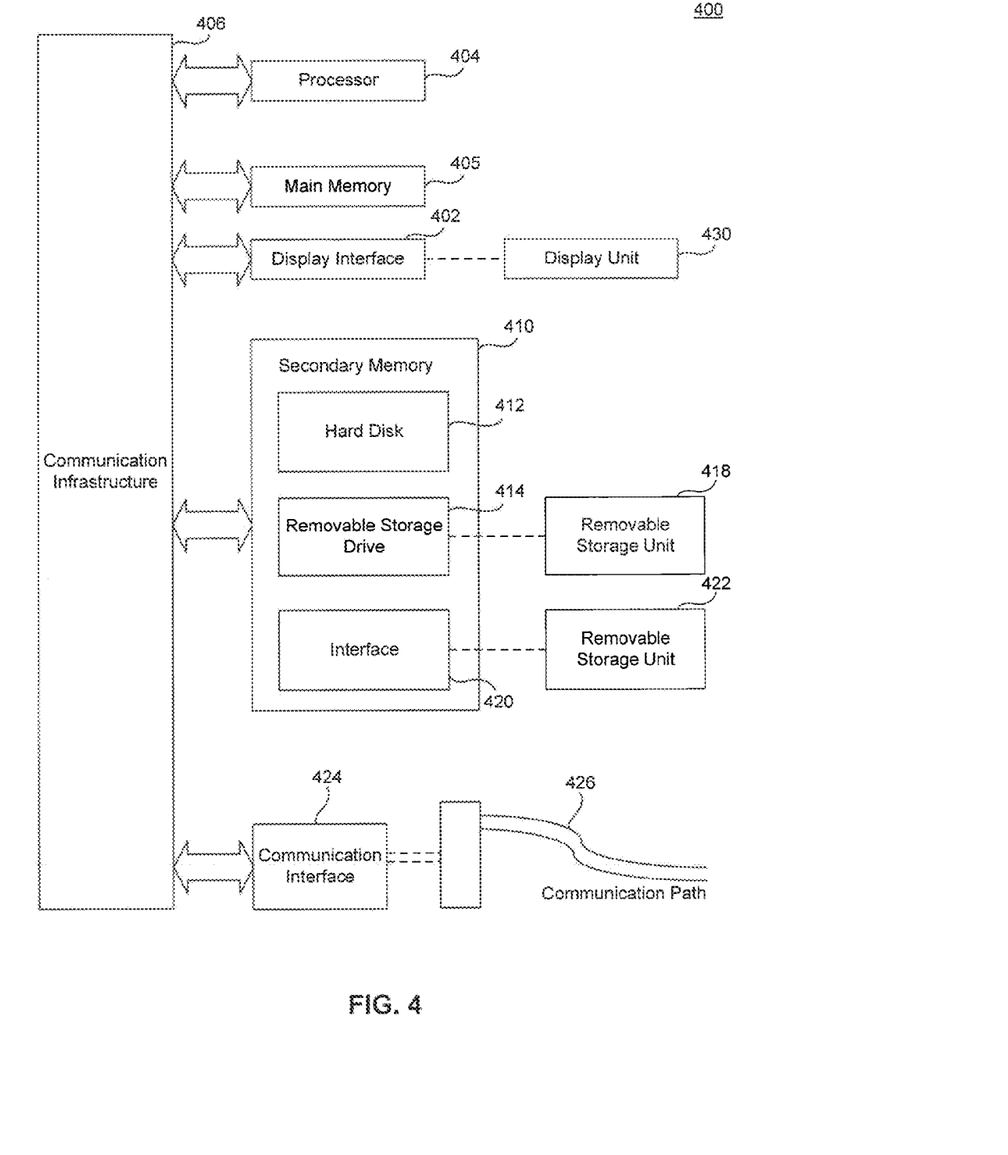
FIG. 4 is a diagram illustrating the architecture of a networked computer, according to an embodiment.

FIG. 4 is an illustration of an example computer system 400 in which embodiments may be implemented as computer-readable code. Hardware, software, or any combination of such may embody any of the components in FIG. 2, such as the components of texture blending unit 202, or the environments illustrated in FIG. 1 or FIG. 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art(s) how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor 404 may be a special purpose or a general-purpose processor device. As will be appreciated by persons skilled in the relevant art, processor 404 may also be a single processor in a multi-core/multiprocessor system, such system operating alone, or in a cluster of computing devices operating in a cluster or server farm. Processor 404 is connected to a communication infrastructure 406, for example, a bus, message queue, network, or multi-core message-passing scheme. Computer system 400 may also include display interface 402 and display unit 430. Display interface 402 allows results of the computer operations to be displayed to a user or an application developer via display unit 430.

Computer system 400 also includes a main memory 405, for example, random access memory (RAM), and may also include a secondary memory 410. Secondary memory 410 may include, for example, a hard disk drive 412, removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 405 and secondary memory 410, which may be memory semiconductors (e.g. DRAMs, etc.).

Computer programs (also called computer control logic) are stored in main memory 405 and/or secondary memory 410. Computer programs may also be received via communications interface 424. Such computer programs, when executed, enable computer system 400 to implement embodiments as discussed herein. In particular, the computer programs, when executed, enable processor 404 to implement the processes, such as the stages in the method illustrated by flowchart 500 of FIG. 5 discussed herein. Accordingly, such computer programs represent controllers of the computer system 400. Where embodiments are implemented using software, the software may be stored in a computer program product and loaded into computer system 400 using removable storage drive 414, interface 420, and hard disk drive 412, or communications interface 424.

Embodiments also may be directed to computer program products including software stored on any computer useable medium. Such software, when executed in one or more data processing device, causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.)

Example Texture Blending Method

Figure 5:
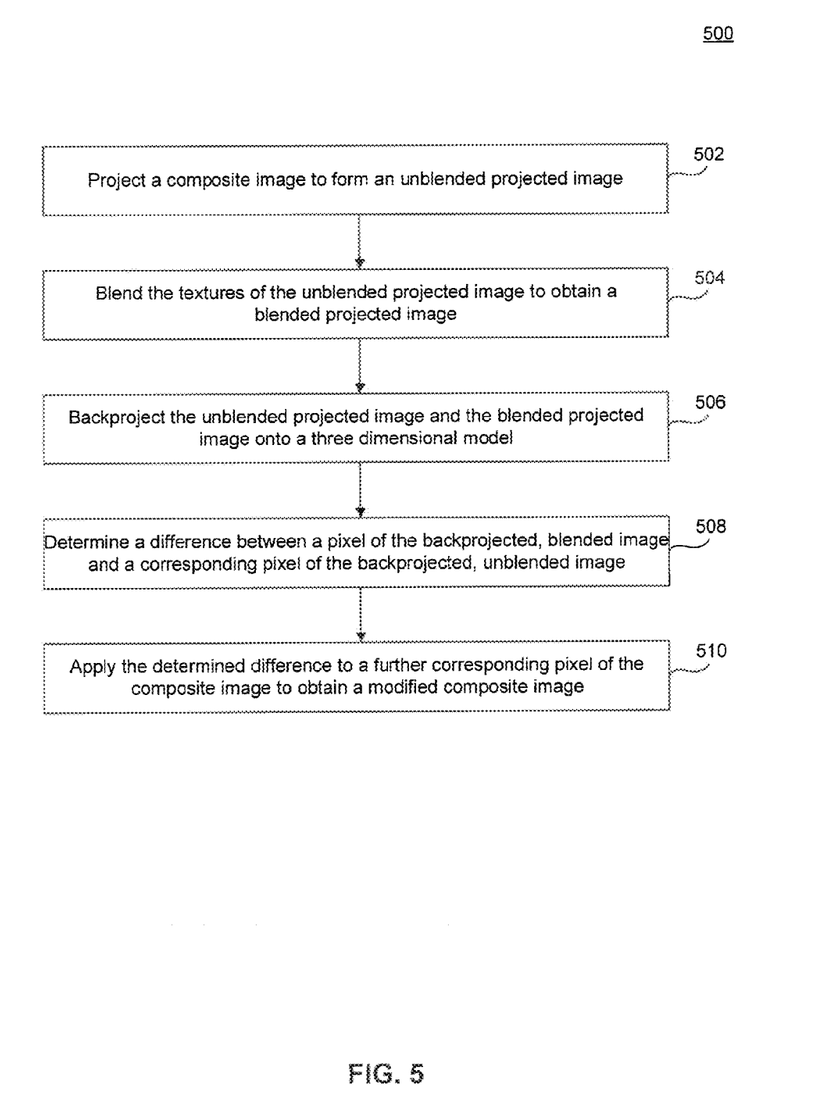
FIG. 5 is a method for blending textures of a composite image, according to an embodiment.

FIG. 5 illustrates an example texture blending method 500, according to an embodiment. Stages 502-510 of texture blending method 500, may be used in operation with texture blending system 200 of FIG. 2. In an embodiment, texture blending method 500 is implemented on computer system 400.

At stage 502, a composite image is projected to form an unblended projected image. The actions performed in stage 502 may be executed via, for example, image projector 104 of texture blending system 100.

At stage 504, the textures of the unblended projected image are blended to obtain a blended projected image. The blending may be performed via a multiband blending technique. The entire image may be blended, or tiled portions of the image may be blended separately. If blending tiled portions is performed, then the filial blended projected image may be obtained by alpha-blending the overlapping tiles. The actions performed in stage 504 may be executed via, for example, blending engine 106 of texture blending system 100.

At stage 506, the unblended projected image and the blended projected image are each backprojected onto the three dimensional model associated with the composite image. The actions performed in stage 506 may be executed via, for example, backprojecting unit 208 of texture blending system 200.

At stage 508, a difference is determined between a pixel of the backprojected, blended image and a corresponding pixel of the backprojected, unblended image. The difference may be a difference associated with a change in the hue or brightness of the pixel. In another example, the difference is determined between a group of corresponding pixels between the two images. The actions performed in stage 508 may be executed via, for example, pixel processing unit 210 of texture blending system 200.

At stage 510, the determined difference is applied to a further corresponding tagged pixel of the composite image to obtain a modified composite image. The final blended modified composite image will maintain the same resolution and level of detail found in the original composite image. The actions performed in stage 510 may be executed via, for example, pixel processing unit 210 of texture blending system 200.

It should be appreciated that other actions beyond those described above may also be a part of texture blending method 500. For example, texture blending method 500 may include tagging one or more of the pixels with a unique ID based on the pixel's associated source image.

Stages 502-510 of texture blending method 500 may be implemented as software, hardware, or firmware, or any combination thereof. Further, operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

CONCLUSION

The detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The detailed description is exemplary and explanatory and is intended to provide further explanation of the invention as claimed.

It would be apparent to one of skill in the relevant art that the embodiments described can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented.

The Summary and Abstract sections may set forth one or more but not all exemplary embodiments as contemplated by the inventor(s), and thus, are not intended to limit the embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method, performed on one or more processors, for blending textures of a composite image formed by a plurality of source images mapped onto a three dimensional model, comprising:
   projecting the composite image to obtain a two dimensional, unblended, projected image having textures;
   blending the textures of the unblended projected image to obtain a blended projected image;
   backprojecting the unblended projected image and the blended projected image onto the three dimensional model;
   determining a difference between a pixel of the backprojected, blended image and a corresponding pixel of the backprojected, unblended image; and
   applying the determined difference to a further corresponding pixel of the composite image to obtain a modified composite image representing a blending of the plurality of source images in the composite image.

2. The method of claim 1, wherein the projecting comprises projecting an oblique composite image.

3. The method of claim 1, wherein the projecting comprises orthorectifying the composite image to obtain an unblended orthorectified image.

4. The method of claim 1, wherein the blending comprises blending the textures using a multiband blending technique.

5. The method of claim 1, further comprising tagging each pixel of the composite image with an ID corresponding to the source image associated with the pixel.

6. The method of claim 1, further comprising dividing the unblended projected image into a plurality of tiles.

7. The method of claim 6, further comprising overlapping each of the plurality of tiles in at least one of X and Y dimensions.

8. The method of claim 6, wherein the textures within each of the plurality of tiles are blended individually.

9. The method of claim 8, wherein the blending the textures comprises blending each of the plurality of tiles together to obtain the blended projected image.

10. The method of claim 1, wherein the determining a difference comprises determining an additive change between a pixel of the backprojected, blended image and a corresponding pixel of the backprojected, unblended image.

11. The method of claim 1, wherein the determining a difference comprises determining a multiplicative change between a pixel of the backprojected, blended image and a corresponding pixel of the backprojected, unblended image.

12. A system for blending textures of a composite image formed by a plurality of source images mapped onto a three dimensional model, comprising:
    an image projector configured to project the composite image to obtain a two dimensional, unblended projected image having textures;
    a blending engine configured to blend the textures of the unblended projected image to obtain a blended projected image;
    a backprojecting engine configured to backproject the unblended projected image and the blended projected image onto the three dimensional model; and
    a pixel processing unit configured to:
        determine a difference between a pixel of the backprojected, blended image and a corresponding pixel of the backprojected, unblended image, and
        apply the difference to a further corresponding pixel of the composite image to obtain a modified composite image representing a blending of the plurality of source images in the composite image.

13. The system of claim 12, wherein the image projector is configured to orthorectify the composite image to obtain an unblended orthorectified image.

14. The system of claim 12, wherein the plurality of source images illustrate content of the model at different perspectives.

15. The system of claim 12, wherein the plurality of source images illustrate content of the model at various brightness levels.

16. The system of claim 12, wherein the plurality of source images illustrate content of the model at various exposure settings.

17. The system of claim 12, wherein the blending engine is configured to blend the textures using a multiband blending technique.

18. The system of claim 12, wherein the composite image is derived from a digital surface model (DSM).

19. The system of claim 12, wherein the blending engine is further configured to separately blend tiled regions of the unblended projected image.

20. An apparatus comprising at least one non-transitory computer readable storage medium encoding instructions thereon that, in response to execution by a computing device, cause the computing device to perform operations comprising:
    projecting the composite image formed by a plurality of the source images mapped onto a three dimensional model to obtain a two dimensional, unblended projected image having textures;
    blending the textures of the unblended projected image to obtain a blended projected image;
    backprojecting the unblended projected image and the blended projected image onto the three dimensional model;
    determining a difference between a pixel of the backprojected, blended image and a corresponding pixel of the backprojected, unblended image; and
    applying the determined difference to a further corresponding pixel of the composite image to obtain a modified composite image representing a blending of the plurality of source images in the composite image.

21. The apparatus of claim 20, wherein the plurality of source images illustrate content of the model at different perspectives.

22. The apparatus of claim 20, wherein the plurality of source images illustrate content of the model at various brightness levels.

23. The apparatus of claim 20, wherein the plurality of source images illustrate content of the model at various exposure settings.

24. The apparatus of claim 20, wherein the composite image is derived from a digital surface model (DSM).

* * * * *